United States Patent Office 3,442,714
Patented May 6, 1969

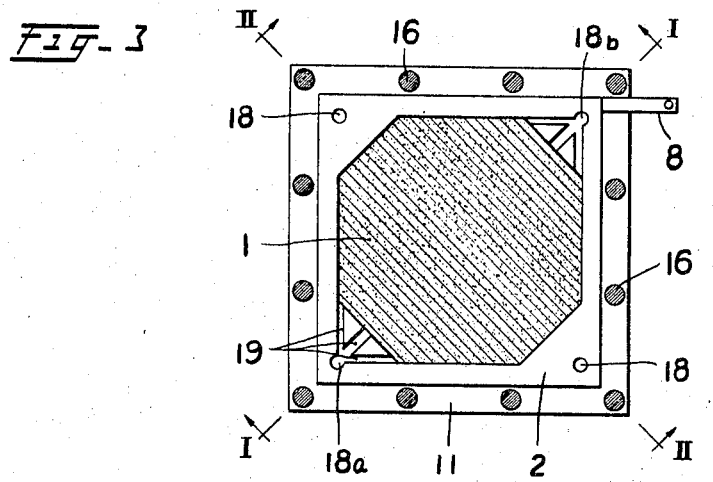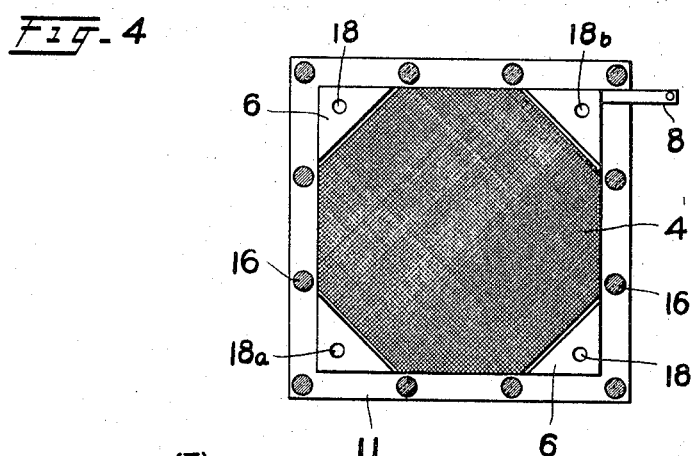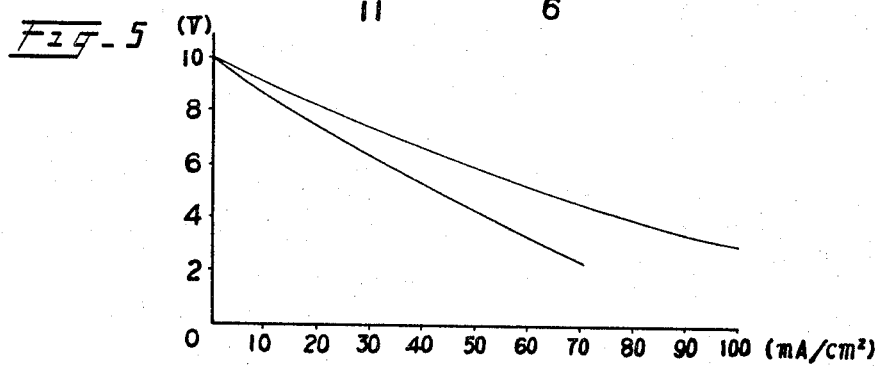

3,442,714
FUEL CELLS
Shiro Matsuno, Takatsuki, Osaka Prefecture, Japan, assignor to Yuasa Battery Company Limited, Takatsuki, Japan, a corporation of Japan
Continuation of application Ser. No. 215,029, Aug. 6, 1962. This application Feb. 27, 1968, Ser. No. 708,726
Int. Cl. H01m 27/04
U.S. Cl. 136—86     2 Claims

ABSTRACT OF THE DISCLOSURE

A fuel cell comprising a hollow tube containing within the tube a plurality of individual cells connected in series. Each cell comprises two electrodes, and each of the electrodes comprises a mass of unbonded discrete granules. The electrodes are separated from each other by a gas impervious separator, and the electrodes of adjacent cells are separated from each other by a gas impervious member across the tubular frame which are electrically conductive. Passageways are provided through the frame to supply oxidizing and fuel gases to the respective electrodes.

---

This is a continuation of parent application Serial No. 215,029, filed Aug. 6, 1962, now adandoned.

This invention relates to the fuel cells, particularly to the improvements of the fuel cells which generate electrical energy by the electro-chemical reaction between hydrogen and oxygen at room temperature under low pressure.

The conventional fuel cells using carbon electrodes are constructed by having the electrolyte in liquid form held between the positive and negative electrodes made of the carbon either sintered or molded by means of binders and then treated with catalysts. In this conventional fuel cells, the electrolyte gradually permeates the electrodes to make them wet and inactive, and as a result the performance of the cells will be deteriorated. To prevent such deterioration, these electrodes are usually given waterproof treatment. This causes the catalysts of electrodes be covered. As a result, when the oxygen gas or the hydrogen gas is supplied to the fuel cells, the three-phase zone, as it is generally called, where the reaction for the generation of electricity should take place, or the effective reaction area between the electrolyte, the catalysts and the gas, is relatively small and moreover, the said reaction is conducted only on the flat surface. This makes it difficult to obtain electrical energy efficiently. In addition, the processes of sintering the carbon, or using the plastic binders, or water-proof treating, are complicated and troublesome, which increase the production cost.

All the disadvantages in the conventional cells described above may be overcome by the present invention.

The first object of this invention is to provide the fuel cells in which the chemical reaction area of the three-phase zone is wide, and the reaction is carried out three-dimensionally, to obtain the electrical energy very efficiently.

The second object of the invention is to provide fuel cells of such a construction as permitting the use of simplified processes of manufacture, which is suitable for mass production.

The third object of the invention is to provide the low-priced, economical fuel cells.

An embodiment of this invention will be described below, referring to the accompanying drawings.

FIG. 3 is a cross sectional plane view of the cell, taken along the line III-III' of FIG. 1.

FIG. 4 is a cross sectional plane view taken along the line IV-IV' of FIG. 1.

FIG. 5 shows comparative performance curves of the fuel cells of the present invention and the conventional one.

Figure 1:
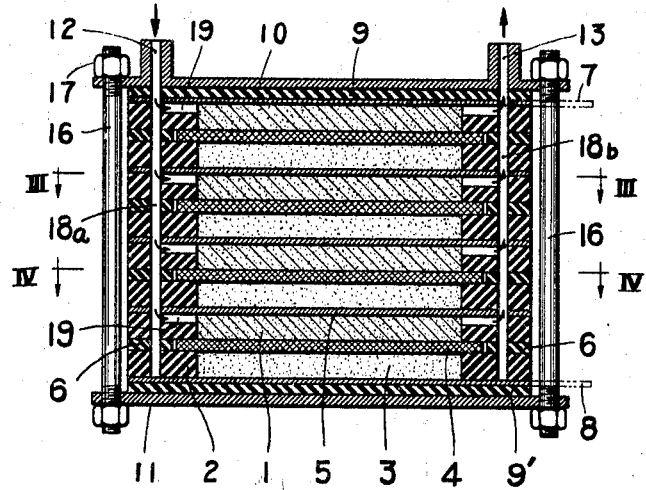
FIG. 1 is a longitudinal sectional view, taken along the line I-I' of FIG. 3, of the fuel cell in accordance with the present invention.

In the drawings, the numeral 1 denotes the negative electrode which is manufactured in the manner explained below:

| | Parts |
|---|---|
| Active carbon | 100 |
| Acetylene black | 10 |
| Graphite | 5 |
| $PdCl_2$ solution (2%) | 100 |

The above materials are compounded together, and the mixture is heated to about 450° C. in a furnace of hydrogen gas atmosphere, and then negative electrode is activated to the mixture by catalysts. The granular product thus obtained is mixed together with a 30% KOH electrolyte at a ratio of 1:1 by weight, to be made a semi-wettable mixture. The material is then charged under pressure into the center hole of the container frame 2. Thus the negative electrode 1 is obtained.

The positive electrode 3 is prepared in the manner described below.

| | Parts |
|---|---|
| Active carbon | 100 |
| Acetylene black | 10 |
| Graphite | 5 |
| $MnCl_2$ solution (5%) | 100 |

An example of the grain-size distribution in the active carbon used in the negative and positive electrodes is shown below:

| Mesh: | Weight percent |
|---|---|
| 20 up | 10 |
| 20–30 | 40 |
| 30–50 | 30 |
| 50 down | 20 |

Figure 2:
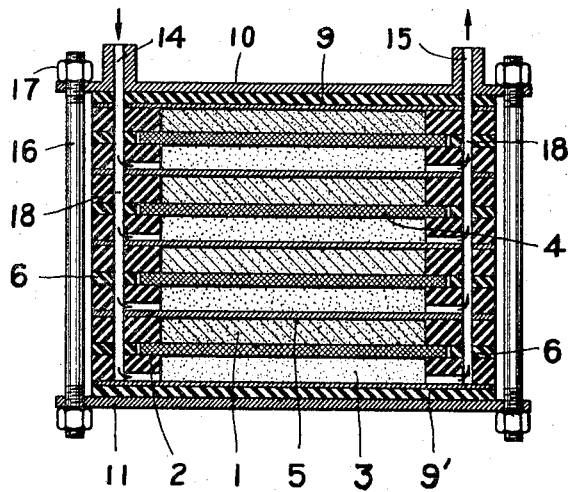
FIG. 2 is a longitudinal sectional view of the same cell taken along the line II-II' of FIG. 3.

The above materials are compounded together and the mixture is neutralized with caustic soda. It is then washed with water and dried, and then made semi-wettable by mixing it with a 30% KOH electrolyte at a weight ratio of 1:1. The material is then charged into the container frame 2. Thus the positive electrode 3 is obtained. Since the carbon granules filled in the electrode are mainly of 20 to 50 mesh as stipulated in the above grain-size distribution, they never prevent circulation of gas. Moreover electrolyte is contained in the electrode in such slight amount as not to prevent circulation of gas. The numeral 4 indicates the separator impregnated in KOH solution. This separator is made of a cellulosic material, such as cellophane, a regenerated cellulosic product, which is pervious to $H_2O$ and ions but practically impervious to gas. By having this material in the separator sandwiched in between filter paper sheets, Japanese paper sheets, synthetic fiber film mats or the like, the mechanical strength of the separator is reinforced. 5 is the metallic collector made of nickel plate and so on. 6 is the rubber packing provided around and at the corners of the separator to make it airtight. A set consisting of the positive electrode, the separator, the negative electrode, and the collector, makes a cell. By combining a plurality of such cells in series or in parallel, the required fuel battery is obtained. FIG. 1 or FIG. 2 shows a plural number of cells layerbuilt in series connection. The collectors located at both ends are extended outward, to form the terminals 7, 8 of the negative and positive electrodes. 9 and 9' are non-conductor rubber packing plates. 10 and 11 are metallic support plates resistant to corrosion by alkali. The support plate 10 is provided with four holes which correspond exactly with the vertical paths located at the corners of the container frame. The support plate protrudes upward at the said paths, to provide the gas introducing paths 12, 14 and exhaust paths 13, 15. The required number of bolts 16 and nuts 17 are attached to the support plates 10, 11, for the purpose of forming the battery into a block. The container frame 2 is made of synthetic resin, and has one vertical path 18 at each of its corners. In addition, the cross groove connected with the pair of vertical paths 18a and 18b, located at opposite corners of the frame, is provided. However, no such cross groove is provided for the other corners of the frame. The cross groove 19 is desirable because, if it is provided by branching it, it permits the gas to come in or out more easily. The vertical paths at the corners, and the cross groove, of the container frame should be positioned symmetrically and in correctly adjusted dimensions, since the container frame is not only used in forming the negative electrode 1 but is also applied to the positive electrode 3. This will be effective in simplifying the component parts and reducing the cost of manufacture of the cell.

In FIG. 1, the arrow marks indicate the introduction and discharge of hydrogen gas: 12 is the introducing path, and 13 the exhaust path, of the hydrogen gas. Similarly, in FIG. 2, the introduction and discharge of oxygen gas or air is clearly shown: 14 is the introducing path of the oxygen gas, and 15 is its exhaust path.

As described above, the granules of the active carbon forming the main part of the negative electrode 1 and the positive electrode 3 which make up the fuel cell of this invention are neither sintered, nor molded by making them adhesive with a binder. Furthermore, no waterproof treatment is given them. These are significant features of this invention and lead to a number of technical advantages. Furthermore, the cathode chamber and the anode chamber are practically gas-tight, without any possibility of the mixing of cathode gas with anode gas. There is therefore no possibility of the danger of explosion, etc. Furthermore, since there is no need of precisely balancing the gas pressures of the two electrodes, the gas feed device can be very simple, requiring practically no adjustment.

Generally, the important problem in the electrode reaction of fuel cells is how the discharge reaction is carried out in the zone where the three phases—the gas phase, the liquid phase, and the solid phase (catalyzer)—meet. In the conventional electrode, the catalyzer is covered with the waterproof treating agent, and as a result the formation of the abovementioned three-phase zone is adversely affected, making it difficult to perform the chemical reaction adequately and obtain the electrical energy in a highly efficient manner. In addition, since the gas pressure shall be balanced with the penetrating pressure of electrolyte, it is necessary to make the fineness of the carbon uniform and thus make the penetration resistance of the gas uniform through the entire surface of the electrode plates. This is troublesome and disadvantageous. However, no such consideration is required in the fuel cells of this invention. Furthermore, the removal of the water, which is the reaction product, is carried out in the following manner. Namely, since the separator in the fuel battery of this invention is made of cellophane impregnated with the KOH electrolyte, the water moves, with the potassium ions in the said electrolyte, from the negative electrode to the positive electrode in the battery, and is discharged out of the battery by the oxygen or air introduced into the positive electrode. Consequently the positive electrode can always maintain a condition suitable for forming the three-phase zone capable of performing the chemical reaction solidly. This provides the advantage of permitting a highly efficient generation of electrical energy. It also makes it unnecessary to give the electrodes the waterproof treatment, or have the carbon sintered and molded by a binding agent. In addition, it is not required to make the fineness of carbon strictly uniform. The carbon for the electrodes of this invention may be simply charged under pressure into the container frame. Thus, many of the conventional processes are made unnecessary in the fuel cells of this invention, which contribute to a reduction in the cost of manufacture of the cell.

FIG. 5 shows comparative test results of the fuel cells of this invention (A) and the conventional fuel cells (B). The figures on the horizontal line represents the current density (ma./cm.$^2$), and those on the line vertical the discharge voltage (v.).

An example of the performance of the fuel cell of this invention is described below.

In the fuel cells in accordance with this invention, consisting of 10 cells series-connected and having an electrode reacting area of 100 cm.$^2$, the discharge voltage showed a value of 7.5 v., with a polarization of 2.5 v., when the current of 30 ma./cm.$^2$ was taken out. The discharge voltage showed a value of 5.2 v. when the current of 60 ma./cm.$^2$ was taken out.

In the conventional battery (curve B in FIG. 5), under the same test conditions as above, the discharge voltage was found to be 6.5 v. at the current density of 30 ma./cm.$^2$, and 3.5 v. at the current density of 60 ma./cm.$^2$.

It is thus found that the fuel cells (A) in accordance with this invention are able, as compared with the conventional battery (B), to produce electrical energy more higher efficiently. This indicates superiority of this fuel cell.

Without departing from the spirit and scope of this invention, it is possible to carry out many modifications and variations of it. For instance, while the cells shown in the attached drawings are series-connected, they may be parallel-connected instead. The shape of the fuel cells as a whole may be either round or polygonal. Furthermore, in place of the carbon granules, it is possible to use metallic granules produced, for instance, from Raney Ni or Raney Ag.

What I claim is:
1. A fuel cell comprising
   a first annular frame member defining an oxidizing gas electrode cavity, an oxidizing gas electrode substantially filling the cavity within said first annular frame member, said oxidizing gas electrode comprising unbonded discrete granules selected from the group consisting of active carbon and metallic granules, said granules being made semiwettable by impregnation with aqueous electrolyte, said oxidizing gas electrode being free of binders and waterproofing agents, said first annular frame member also having a pair of axially-extending oxidizing gas passageways and a pair of axially-extending fuel gas passageways through it, and generally radial apertures communicating with said oxidizing gas electrode cavity and said oxidizing gas passageways for input and withdrawal of oxidizing gas,
   a second annular frame member defining a fuel electrode cavity, a fuel gas electrode substantially filling the cavity within said second annular member, said fuel gas electrode comprising unbonded discrete granules selected from the group consisting of active carbon and metallic granules, said granules being made semiwettable by impregnation with aqueous electrolyte said fuel gas electrode being free of binders and waterproofing agents, said second annular frame member also having a pair of axially-extending oxidizing gas passageways and a pair of axially-extending fuel gas passageways through it, and apertures communicating with said fuel gas passageways and said fuel electrode cavity for input and withdrawal of fuel gas, a water pervious gas impervious, electrolyte impregnated separator between and in physical contact with said electrodes, the perimeter of said separator overlying and being between said first and second annular frame members but not across said fuel gas and oxidizing gas passageways, a gas-tight annular packing around said separator and between said first and second annular frame members, said annular packing having a pair of axially-extending oxidizing gas passageways aligned with and communicating between the oxidizing gas passageways in said first and second annular frame members, and a pair of axially-extending fuel gas passageways aligned with and in communication with the fuel gas passageways in said first and second annular frame members, gas impervious members across the open ends of said frame members to close said cavities, an electrically-conducting anode in electrical contact with said fuel gas electrode and an electrically-conducting cathode in electrical contact with said oxidizing gas electrode.

2. A series connected fuel cell battery comprising a plurality of series connected fuel cells, each of said cells comprising a first annular frame member defining an oxidizing gas electrode cavity, an oxidizing gas electrode substantially filling the cavity within said first annular frame member, said oxidizing gas electrode comprising unbonded discrete granules selected from the group consisting of active carbon and metallic granules, said granules being made semi-wettable by impregnation with aqueous electrolyte said oxidizing gas electrode free of binders and waterproofing agents, said first annular frame member also having a pair of axially-extending oxidizing gas passageways and a pair of axially-extending fuel gas passageways through it, and generally radial apertures communicating with said oxidizing gas electrode cavity and said oxidizing gas passageways for input and withdrawal of oxidizing gas, a second annular frame member defining a fuel electrode cavity, a fuel gas electrode substantially filling the cavity within said second annular member, said fuel gas electrode comprising unbonded discrete granules selected from the group consisting of active carbon and metallic granules, said granules being made semiwettable by impregnation with aqueous electrolyte said fuel gas electrode being free of binders and waterproofing agents, said second annular frame member also having a pair of axially-extending oxidizing gas passageways and a pair of axially-extending fuel gas passageways through it, and generally radial apertures communicating with said fuel gas passageways and said fuel electrode cavity for input and withdrawal of fuel gas, a water pervious gas impervious, electrolyte impregnated separator between and in physical contact with said electrodes, the perimeter of said separator overlying and being between said first and second annular frame members but not across said fuel gas and oxidizing gas passageways, a gas-tight annular packing around said separator and between said first and second annular frame members, said annular packing having a pair of axially-extending oxidizing gas passageways aligned with and communicating between the oxidizing gas passageways in said first and second annular frame members, and a pair of axially-extending fuel gas passageways aligned with and in communication with the fuel gas passageways in said first and second annular frame members, said series connected fuel cell battery also including means securing said plurality of cell together with the oxidizing and fuel gas passageways of the respective cells aligned with and communicating with each other, an electrically conducting gas impervious member across the open end of each of said cavities in the interior of said battery, in electrical contact with the fuel gas electrode of one cell and the oxidizing gas electrode of the next cell, a gas-tight electrically conductive cathode across the open end of the oxidizing gas electrode cavity of the cell at one end of said battery, and in electrical contact with the electrode therein, and a gas-tight electrically conductive anode across the open end of the fuel gas electrode cavity of the cell at the other end of said battery, and an electrical contact with the electrode therein.

References Cited

UNITED STATES PATENTS

| | | | |
|---|---|---|---|
| 409,366 | 8/1889 | Mond et al. | 136—86 |
| 913,390 | 2/1909 | Jungner | 136—86 |
| 3,212,936 | 10/1965 | McEvoy | 136—120 |
| 3,188,242 | 6/1965 | Kordesch et al. | 136—86 |
| 3,253,956 | 5/1966 | Vielstick et al. | 136—86 |
| 3,256,116 | 6/1966 | Justi et al. | 136—86 |

WINSTON A. DOUGLAS, *Primary Examiner.*

HUGH FEELEY, *Assistant Examiner.*

U.S. Cl. X.R.

136—120